June 25, 1957 — W. M. RICKERT — 2,797,035
SPARE TIRE MOUNT SAFETY CATCH
Filed Sept. 9, 1953 — 2 Sheets-Sheet 1
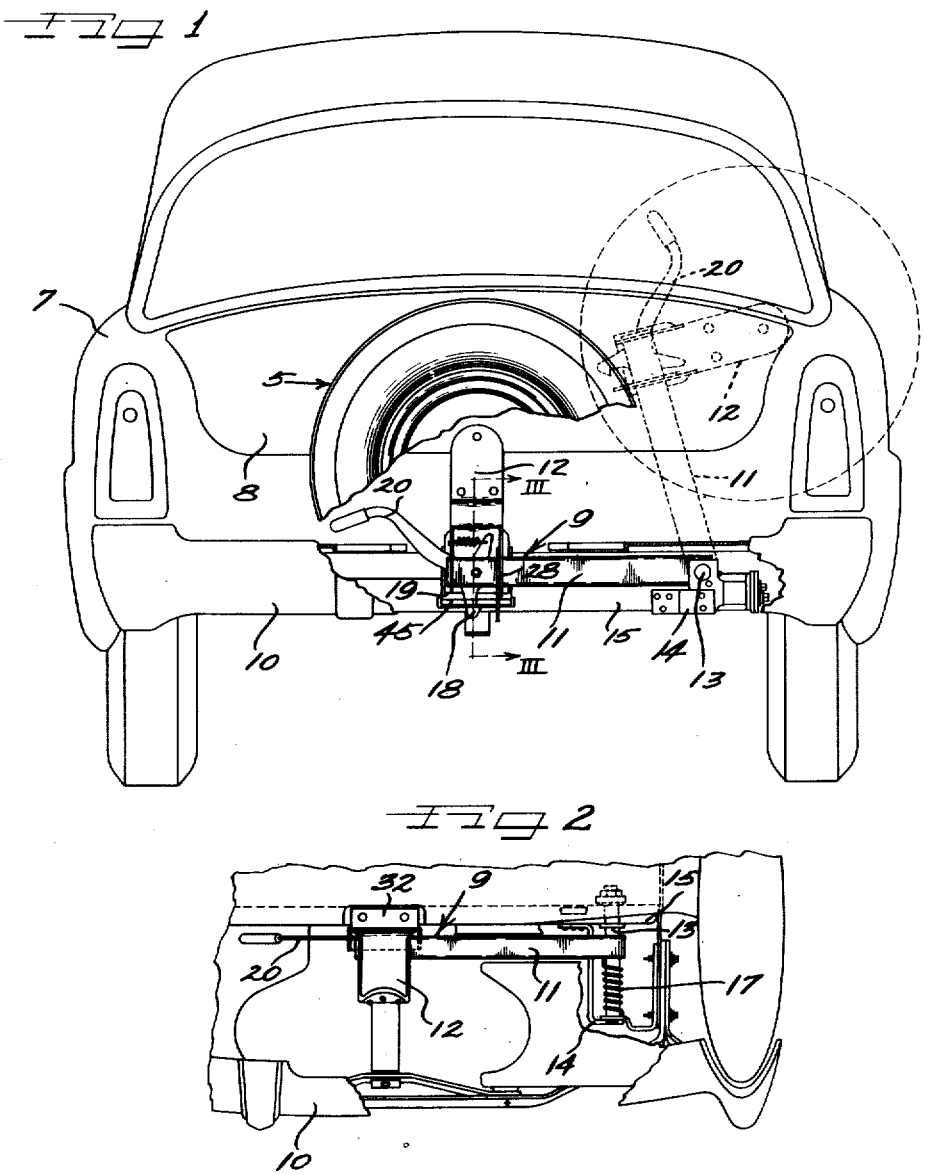
Inventor
Willy M. Rickert

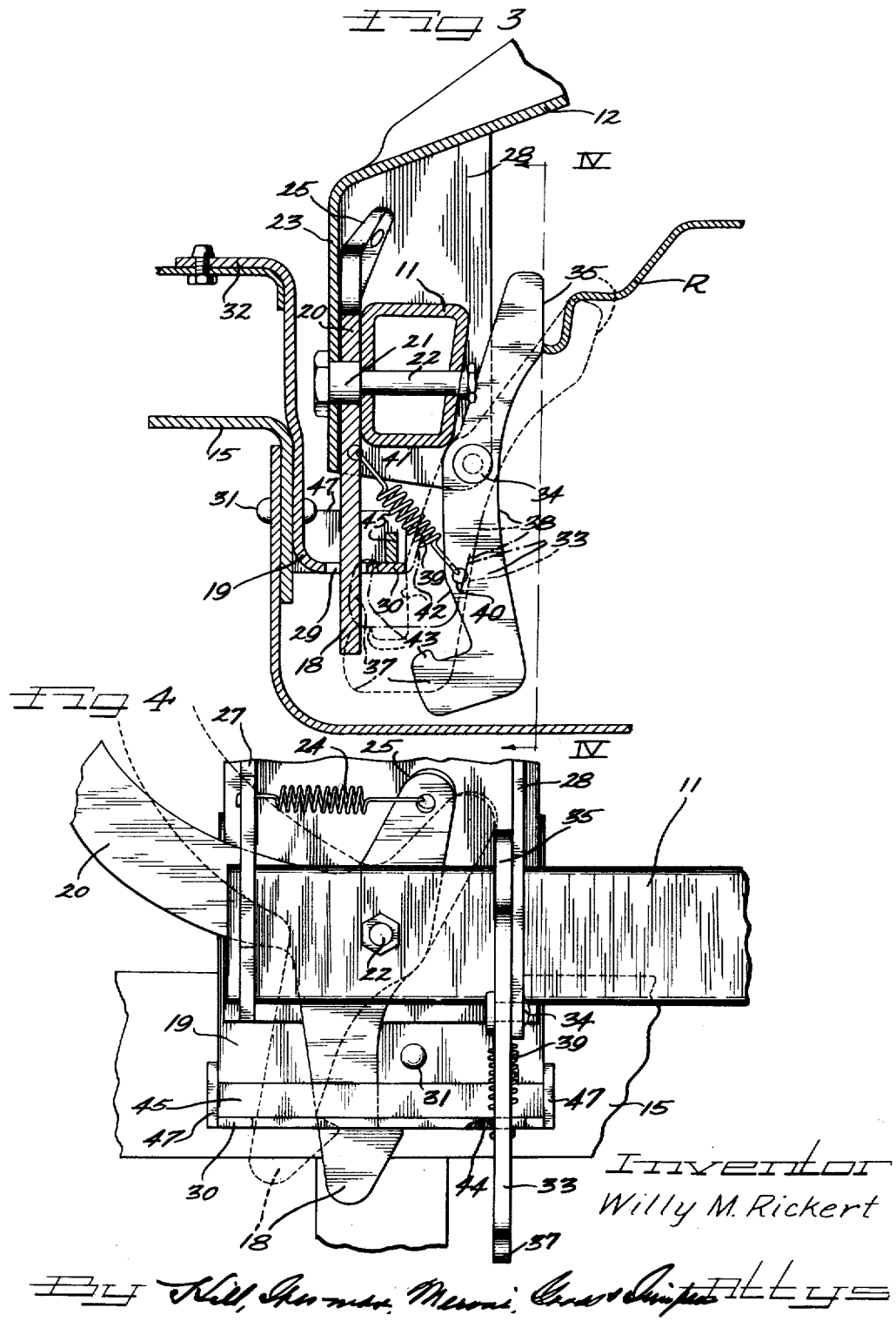

United States Patent Office 2,797,035
Patented June 25, 1957

2,797,035

SPARE TIRE MOUNT SAFETY CATCH

Willy M. Rickert, Detroit, Mich., assignor to Houdaille-Hershey Corporation, Detroit, Mich., a corporation of Michigan Application September 9, 1953, Serial No. 379,213

5 Claims. (Cl. 224—42.21)

The present invention relates to improvements in spare wheel or tire mounts for automobiles and more especially relates to such a mount embodying novel safety catch mechanism.

In spare wheel mounts for automobiles, such as disclosed in the copending application of Alan D. Brundage et al., Serial No. 339,314 filed February 27, 1953, a rockably mounted arm supports a spare tire and wheel assembly at the rear of an automobile. The supporting arm is counterbalanced by means of a strong spring, enabling easy swinging of the arm and spare wheel into an upward and sideward clearance position relative to the rear luggage compartment closure or lid of the automobile.

Should the spare wheel for any reason not be on the spare wheel mount, but the supporting arm be disposed in the swung-down, latched position wherein the counterbalancing spring is under maximum load, accidental or careless unlatching and release of the arm may result in catapault-like, violent springing up of the arm. While the probability of such an occurrence may actually be rather small with a spare wheel mount of this character, since as a practical matter a spare wheel will normally be mounted on the supporting arm, it is to avoid the possibly remote chance that the spring biased mount arm may be latched free of a spare wheel for which the present invention provides safety means.

It is accordingly an important object of the present invention to provide safety means for spare wheel mounts for automobiles or the like.

Another object of the invention is to provide novel safety catch mechanism for spring counterbalanced spare wheel supporting arms of spare wheel mounts.

A further object of the invention is to provide in a counterbalanced swinging arm type of spare wheel mount novel safety catch mechanism which is automatically inactivated when conditions prevail which avoid the necessity for the safety device.

Still another object of the invention is to provide a safety catch device for swinging arm spare wheel mounts manually operable for intentional release of the spare wheel mount in the absence of a spare wheel.

Other objects, features and advantages of the present invention will be readily apparent from the following detailed description of a preferred embodiment thereof taken in conjunction with the accompanying drawings in which:

Figure 1 is a more or less schematic rear elevational view of an automobile equipped with a spare tire mount embodying the features of the present invention, and with certain parts broken away and in section for purposes of illustration;

Figure 2 is a fragmentary top plan view of the rear end portion of the vehicle and the spare wheel mount, with certain parts broken away or omitted for clarity of illustration;

Figure 3 is a fragmentary enlarged sectional detail view taken substantially on the line III—III of Figure 1; and Figure 4 is a fragmentary rear elevational and sectional view taken substantially on the line IV—IV of Figure 3.

It is customary to carry a spare wheel and pneumatic tire and tube assembly on an automobile to replace one of the running wheels of the vehicle in an emergency such as when the tire of one of the running wheels blows out or goes flat. Where such a spare wheel assembly 5 (Fig. 1) is mounted externally of an automobile 7, and more especially at the rear of the automobile behind the luggage compartment closed by a lid or cover 8, it becomes necessary to move the spare wheel assembly out of the way when access into the luggage compartment, through the opening afforded by raising of the door or cover 8 is desired. Accordingly, a spare wheel mount 9 of the kind more fully described in the above mentioned Brundage et al. application Serial No. 339,314 may be employed for supporting the spare wheel assembly.

A desirable characteristic of the spare wheel mount 9 is that the spare wheel assembly 5 may normally be disposed in centered relation at the rear of the automobile close to the baggage compartment and inside of a rear bumper 10 carried by the vehicle, but from which position the spare wheel assembly can be easily moved to an out-of-the-way position at one side of the space required at the rear of the vehicle for access into the storage compartment. To this end, the spare wheel mount 9 comprises an elongated arm 11 carrying fixedly at one end a bracket 12 upon which the spare wheel assembly 5 is adapted to be mounted, and mounted at its opposite end upon a rock shaft 13 (Figs. 1 and 2). The rock shaft 13 is mounted upon suitable bracket structure 14 and a cross bar 15 attached to the rear of the vehicle and with the pivotal axis of the rock shaft disposed in a front to rear direction and sufficiently to one side of the longitudinal axis of the vehicle to enable swinging of the spare wheel supporting bracket 12 from a centered relation to the rear of the vehicle as shown in full outline in Figs. 1 and 2 to the out-of-the-way position shown in dash outline in Fig. 1.

In order to substantially counterbalance the weight of the spare wheel assembly 5, a torsion coiled spring is disposed about a rearwardly extending portion of the rock shaft 13, with one end of the spring anchored on the arm 11 and the opposite end of the spring anchored on the bracket structure 14 under such loading conditions that the arm 11 is normally biased into the upwardly swung out-of-the-way position with sufficient force to substantially counterbalance the weight of the spare wheel assembly 5. It will be appreciated, therefore, that in the absence of the spare wheel assembly 5, and the substantial weight thereof, the biasing spring 17 will proportionally resist swinging of the arm 11 and the bracket 12 into the lowered position thereof, and after the arm and bracket have been swung down, accompanied by further winding up and loading of the spring incident to the swinging down of the arm, strong potential energy is stored in the mechanism tending to react with violent kinetic force should the arm 11 be released from adequate restraint.

For maintaining the supporting arm 11 and the bracket 12 in lowered service position, as desired, a latch 18 is provided in association with the bracket 12 and operatively engageable with a keeper bracket 19 fixedly mounted upon the cross bar 15. The latch 18 may comprise a hook-like member forming a depending short arm of a bell crank operating lever 20 pivotally mounted upon a bearing collar or shoulder 21 of a bolt member 22 extending through the forward end portion of the arm 11 and a depending flange 23 of the wheel supporting bracket forwardly of the arm and defining therewith a space within which the latch lever is pivotally movable. Normal latching bias is afforded for the latch 18 by a tension spring 24 which is engaged at one end with an upstanding ear 25 on the latch lever and one of a pair of left and right hand vertical rearwardly directed integral bracket plates 27 and 28, respectively, carried by the bracket 12 and serving as the means by which the bracket is secured to the arm 11.

When the spare wheel mount arm 11 and the bracket 12 are swung down to the lowermost position thereof, the latch 18 automatically engages through a slot 29 in a rearwardly directed flange 30 of the keeper bracket 19 disposed in proper underlying relation to the lowered spare wheel mount bracket 12. The biasing spring 24 automatically causes the latch 18 to snap into retaining engagement under the bracket 30 at the latching end of the slot 29 as shown in full outline in Figs. 1 and 4. Release of the spare wheel mount arm and bracket is easily effected by swinging the latch arm 20 upwardly to release the latch 18 from the keeper flange 30, substantially as shown in dash outline in Fig. 4.

It will be observed that the keeper bracket 19 may comprise an angular member secured as by means of rivets 31 to the rear face of the bar 15 and with an upper portion of the bracket providing a forwardly directed flange 32 secured fixedly to the body of the vehicle for purpose of rigid stability of the keeper bracket.

According to the present invention, safety means are provided for assuring positive restraint upon upward swinging of the arm 11 and the bracket 12 into the out-of-the-way position, should the spare wheel assembly 5 not be on the spare wheel mount, and the latch 18 is accidently released from the keeper 19. To this end, a substantially L-hook catch member 33 is provided which is mounted in association with the bracket 12 and is adapted to engage the keeper flange 30 for safety purposes. Herein the safety catch member 33 comprises a flat bar which may comprise a stamping from heavy sheet metal, of substantial length and intermediately pivotally attached by means of a rivet 34 or the like to the lower rear portion of the slide plate 28 of the mounting bracket structure.

At its upper or head end portion the safety catch member 33 is provided with a rearwardly directed shoulder 35 which is disposed to be engaged by the adjacent edge of the inner terminal flange of a tire rim R comprising part of the wheel assembly 5 mounted on the spare wheel mount (Fig. 3). When the shoulder 35 is thus engaged, a downwardly and forwardly and upwardly directed hook 37 on the safety catch 33 is held in a rearwardly swung position wherein the hook lies rearwardly clear of the keeper flange 30 as viewed in full line in Fig. 3. It will be observed that between the shoulder 35 and the hook 37, the rear edge of the safety catch bar 33 is concavely contoured as indicated at 38 in order to accommodate the lateral bulge of a tire on the spare wheel.

Should there be no spare wheel upon the mount, suitable biasing means such as a coiled tension spring 39 acts upon the safety catch member 33 to swing the same pivotally clockwise as viewed in Fig. 3 to move the hook 37 into a position wherein it will underlie the keeper flange 30 in the lowered latched position of the spare wheel mount. One end of the spring 39 is preferably anchored through a suitable aperture 40 in the safety latch member located substantially below the pivot 34, while the opposite end of the spring is anchored in spring tensioning relation through an aperture 41 in the rear lower portion of the side flange 28. A stop shoulder 42 on the forward edge of the safety latch member 33 above the hook 37 is engageable with the adjacent portion of the rear edge of the keeper flange 30, as seen in dash outline in Fig. 3. The shoulder 42 is preferably vertically straight in this relationship.

When the spare wheel mount is lowered toward latched position, without the spare wheel thereon, the safety latch member 33 can be swung manually counterclockwise as viewed in Fig. 3, against the bias of the spring 39 to clear the latch hook 37 for passage by the keeper flange 30. Upon release of the manual pressure or force against the keeper latch it will be snapped by the spring 39 into the dash line safety position of Fig. 3.

Should the spare wheel mount then be released from its latched position, in the absence of a spare wheel thereon, the latch hook 37 will engage under the keeper latch 30 after only slight upward springing of the mount, as depicted in the dot dash position in Fig. 3, thereby holding the spare wheel mount against further upward springing under the strong influence of the biasing spring 17.

In order to insure positive, non-slipping interlocking engagement with the keeper bracket flange 30 the engagement hook 37 of the safety latch is provided with an upwardly directed terminal projection 43 which is engageable within a suitable aperture 44 in the keeper flange 30. Thus, in order to release the safety latch hook 37 from the keeper flange 30 positive downward pressure must be exerted on the spare wheel mount, as for example through the latch handle 20 and then the safety latch member 33 must be swung out of latching position. This assures that the person effecting release of the safety latch will have positive control of the spare wheel mount to restrain the same against catapulting upwardly.

In order to relieve the keeper flange 30 from localized strain and stress, a reenforcing bar 45 is preferably secured as by welding across the top of the lip of the flange rearwardly from the safety latch aperture 44 and the locking latch aperture 29. The sides of the keepeer flange 30 and the ends of the reenforcing bar 45 are attached to respective truss bars 47 which extend forwardly and are in turn secured to the lower side edges of the upstanding portion of the keeper bracket 19. This affords a firm, rigid and thoroughly resistant keeper structure which will effectively withstand the strains and shocks incident to normal service requirements.

It will be understood that modifications and variations may be effected without departing from the scope of the novel concepts of the present invention.

I claim as my invention:

1. A spare wheel mount for a vehicle comprising, an arm swingably mounted on a vehicle at one end portion of said arm and about a horizontal axis; supporting means at the other end portion of said arm for supporting a spare wheel assembly; a spring acting on said arm and exerting a biasing force in direction and with a magnitude to counterbalance the combined weight of said arm and the spare wheel assembly; a retaining latch structure comprising a biased first member pivotally secured to said other end portion of said arm and having a notch and an integral release handle, and a keeper member fixedly secured to said vehicle, said keeper and said notch of said first member coacting, when interengaged with each other, to hold said arm in a generally horizontal position and against the biasing force of said spring; and a safety latch comprising a lever secured by a pivot to said other end portion of said arm, said lever having a hook shaped latching section on one side of said pivot and biased toward said keeper for interengagement therewith, and having a sensing section on the other side of said pivot and adjacent to said supporting means for engagement with the spare wheel assembly and for holding said lever out of engagement with said keeper, said latching section operating to restrain said arm when concurrently said arm is in said horizontal position, said sensing section is unengaged, aid said release handle has been releasably actuated.

2. A spare wheel mount comprising, an arm swingably mounted at one end portion about a horizontal axis; supporting means at the other end portion of said arm for supporting a spare wheel assembly; a spring acting on said arm and exerting a biasing force in a direction and with a magnitude substantially in excess of that needed to swing said arm from a generally horizontal position to a generally vertical position; a retaining latch structure having a manual release means and associated with said other end portion of said arm; a keeper separately coactive with said retaining latch structure, said keeper and said latch coacting, when interengaged with each other, to hold said arm in a generally horizontal position and against the biasing force of said spring; and a safety latch separably coactive with said keeper, said latch comprising a pivoted lever having a latching section biased towards said keeper for interengagement therewith, and having a sensing section adjacent to said supporting means for engagement with the spare wheel assembly and for holding said lever out of engagement with said keeper, said latching section operating to restrain said arm when concurrently said arm is in said horizontal position, said sensing section is unengaged, and said manual release means has been releasably actuated.

3. A spare wheel mount comprising, an arm swingably mounted at one end portion about a horizontal axis; supporting means at the other end portion of said arm for supporting a spare wheel assembly; a spring acting on said arm and exerting a biasing force in a direction and with a magnitude substantially in excess of that needed to swing said arm from a generally horizontal position to a generally vertical position; a safety latch associated with said other end portion of said arm and separably coactive with a keeper; said safety latch comprising a pivoted lever having a latching section biased towards said keeper for interengagement therewith, and having a sensing section adjacent to said supporting means for engagement with the spare wheel assembly and for holding said lever out of engagement with said keeper, said latching section and said keeper, when interengaged with each other, coacting to hold said arm in a generally horizontal position and against the biasing force of said spring, said latching section and said keeper being interengaged with each other to restrain said arm only when concurrently said arm is in said horizontal position and said sensing section is unengaged.

4. A spare wheel mount for a vehicle comprising, an arm swingably mounted on a vehicle at one end portion of said arm and about a horizontal axis; supporting means at the other end portion of said arm for supporting a spare wheel assembly; a spring acting on said arm and exerting a biasing force in a direction and with a magnitude substantially in excess of that needed to swing said arm from a generally horizontal position to a generally vertical position; and a safety latch separably coactive with a keeper fixedly secured to said vehicle; said safety latch comprising a lever secured by a pivot to said other end portion of said arm, said lever having a hook shaped latching section on one side of said pivot and biased towards said keeper for interengagement therewith, said lever having a sensing section on the other side of said pivot and adjacent to said supporting means for engagement with the spare wheel assembly and for holding said lever out of engagement with said keeper; said latching section and said keeper, when interengaged with each other, coacting to hold said biased arm in a generally horizontal position and against the biasing force of said spring; said latching section and said keeper being interengaged with each other to restrain said arm only when concurrently said arm is in horizontal position and said sensing section is unengaged.

5. A spare wheel mount for a vehicle comprising, an arm swingably mounted on a vehicle at one end portion of said arm and about a horizontal axis; supporting means at the other end portion of said arm for supporting a spare wheel assembly; a spring acting on said arm and exerting a biasing force in a direction and with a magnitude substantially in excess of that needed to swing said arm from a generally horizontal position to a generally vertical position; a retaining latch structure comprising a biased pivoted member having a notch and manual release means, and a keeper member, one of said members being secured to said other end portion of said arm and the other of said members being secured to the vehicle; said keeper member being interengageable with said notch of said pivoted member, and when so interengaged, coacting to hold said arm in a generally horizontal position and against the biasing force of said spring; and a safety latch associated with said retaining latch structure, said safety latch comprising a pivoted member having a latching section biased towards said retaining latch structure for interengagement therewith, and having a sensing section adjacent to said supporting means for engagement with the spare wheel assembly for holding said pivoted member out of engagement with said retaining latch structure, said latching section interengaging said retaining latch structure to prevent release of said biased arm only when concurrently said arm is in said horizontal position and said sensing section is unengaged.

References Cited in the file of this patent

UNITED STATES PATENTS

| | | |
|---|---|---|
| 2,117,049 | Widman et al. | May 10, 1938 |
| 2,302,957 | Rhodes | Nov. 24, 1942 |
| 2,658,779 | Dall | Nov. 10, 1942 |
| 2,711,273 | Stromberg | June 21, 1955 |
| 2,733,847 | Pyes | Feb. 7, 1956 |

FOREIGN PATENTS

| | | |
|---|---|---|
| 373,948 | Great Britain | June 2, 1932 |

UNITED STATES PATENT OFFICE

CERTIFICATE OF CORRECTION

Patent No. 2,797,035 June 25, 1957

Willy M. Rickert

It is hereby certified that error appears in the above numbered patent requiring correction and that the said Letters Patent should read as corrected below.

In the grant, lines 2 and 3, for "assignor to Houdaille-Hershey Corporation, of Detroit, Michigan, a corporation of Michigan," read -- assignor to Houdaille Industries, Inc., a corporation of Michigan,; line 12, for "Houdaille-Hershey Corporation, its successors or assigns" read -- Houdaille Industries, Inc., its successors or assigns --; in the heading to the printed specification, lines 3 and 4, for "assignor to Houdaille-Hershey Corporation, Detroit, Mich., a corporation of Michigan" read -- assignor to Houdaille Industries, Inc., a corporation of Michigan --.

Signed and sealed this 1st day of October 1957.

(SEAL)
Attest:
CARL H. AXLINE
Attesting Officer

ROBERT C. WATSON
Commissioner of Patents